Figure 5:
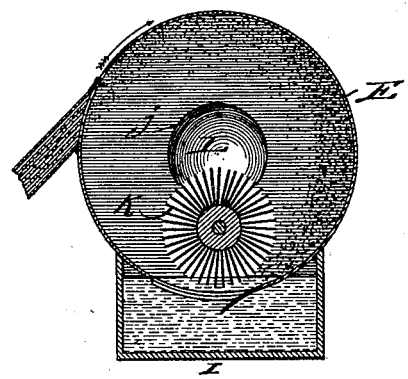

(No Model.) 4 Sheets—Sheet 1.
A. RAYMOND.
METHOD OF PURIFYING SMOKE.
No. 467,264. Patented Jan. 19, 1892.
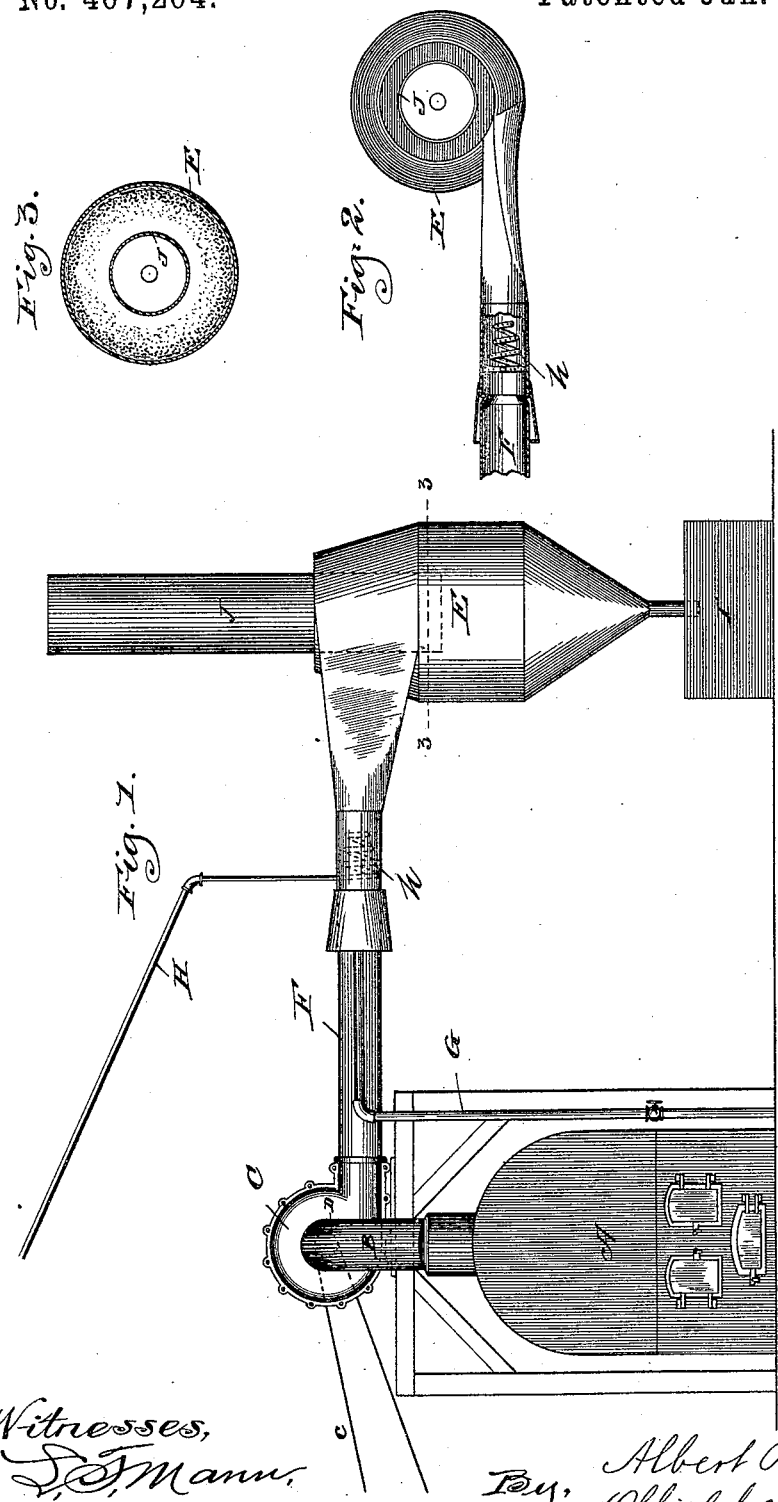

(No Model.)  
4 Sheets—Sheet 2.
A. RAYMOND.
METHOD OF PURIFYING SMOKE.
No. 467,264. Patented Jan. 19, 1892.
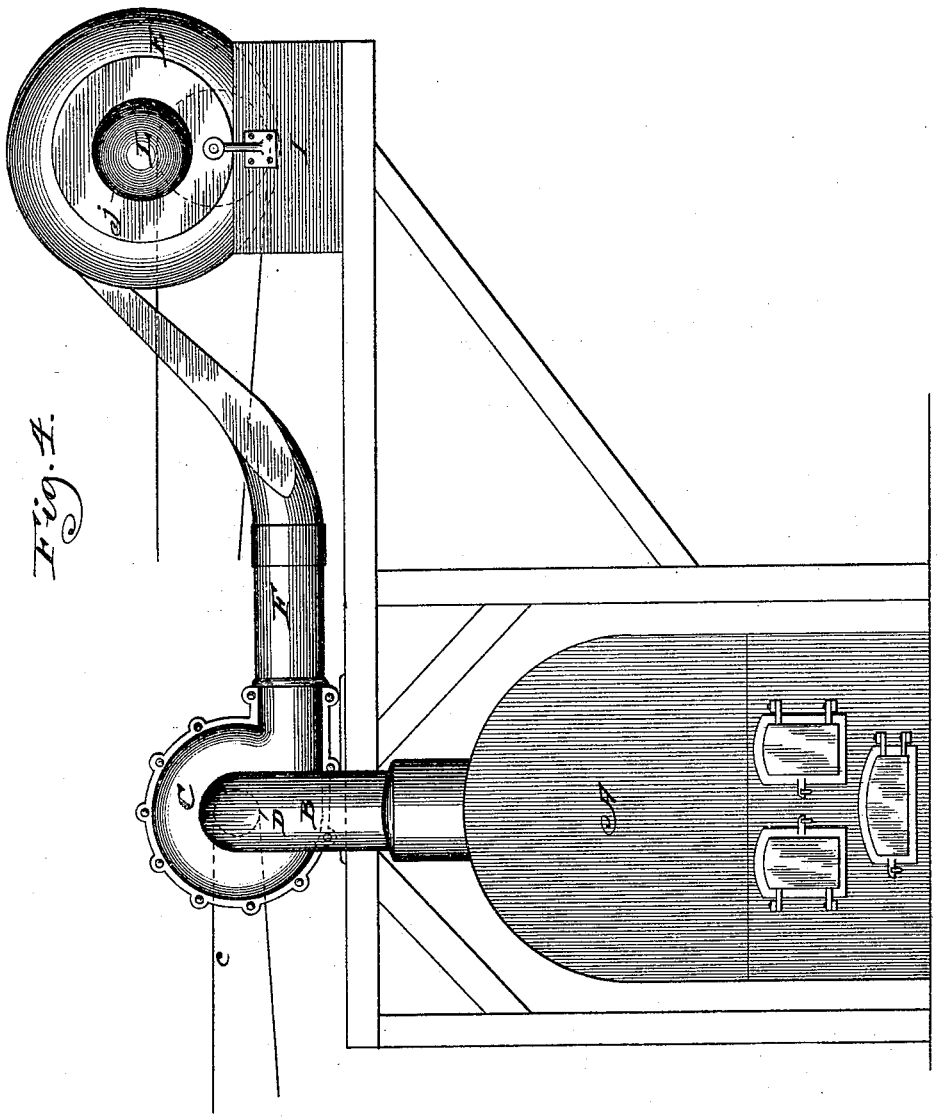
Witnesses,  
L. T. Mann  
A. M. Bond.
Inventor,  
Albert Raymond  
By, Offield & Towle  
Attys.

(No Model.) 4 Sheets—Sheet 3.
A. RAYMOND.
METHOD OF PURIFYING SMOKE.

No. 467,264. Patented Jan. 19, 1892.

Witnesses,
J. F. Mann.
A. M. Bond.

Inventor,
Albert Raymond
By Offield & Towle
Attys.

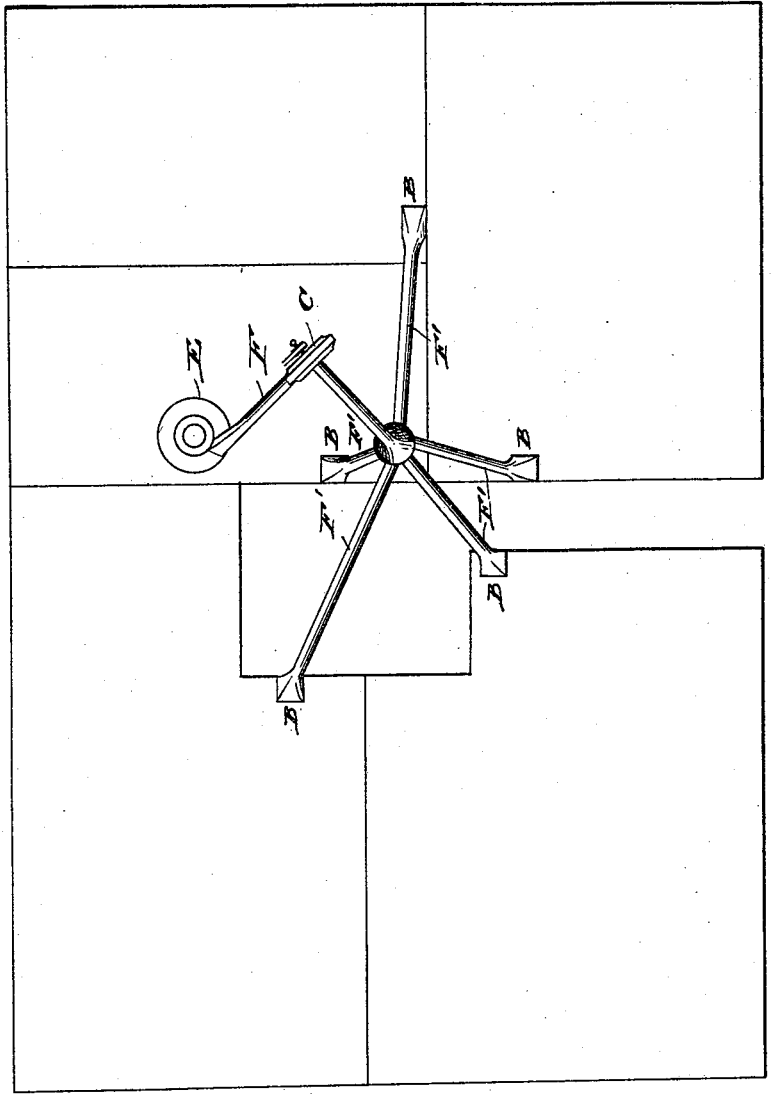

UNITED STATES PATENT OFFICE.

ALBERT RAYMOND, OF CHICAGO, ILLINOIS, ASSIGNOR OF TWO-THIRDS TO GEORGE RAYMOND AND OSWALD KUTSCHE, BOTH OF SAME PLACE.

METHOD OF PURIFYING SMOKE.

SPECIFICATION forming part of Letters Patent No. 467,264, dated January 19, 1892.

Application filed July 31, 1890. Serial No. 360,467. (No model.)

*To all whom it may concern:*

Be it known that I, ALBERT RAYMOND, a citizen of the United States, residing at Chicago, Illinois, have invented certain new and useful Improvements in Methods of Purifying Air, of which the following is a specification.

This invention relates to the purification of the air or smoke discharged from chimneys, furnace stacks or flues, from the unconsumed particles of the fuel, and from the odors and foul gases with which the air may be laden; and the invention consists in subjecting the air-currents to the action of centrifugal force while in a moist condition, whereby the air is purified from foul gases or odors and the foreign particles thereof are weighted to facilitate their separation from the air-currents.

It is well known that the discharge of smoke from chimneys in thickly-populated districts is the cause of great annoyance to persons and of damage to property, and that these conditions are aggravated by the discharge into furnace-stacks of the foul air from closets, rendering-tanks, and other contaminated sources.

My principal object is to purify the air thus laden with solid and sooty particles and impregnated with odors, so as to obviate the nuisance and damage, and incidentally to separate from the impure air material fit for use again in the arts.

An apparatus adapted to the carrying out of this invention should comprise a conduit or conduits from one or more chimneys, stacks, or flues from which the air is discharged, said conduit discharging the air into a centrifugal separator, preferably under a blast, and moistened by a spray of water or steam. The moistened air is caused by the shape of the walls and the direction of the inlet to whirl or gyrate, and the heavier particles are thrown out of the current under the action of centrifugal force, and, falling down by gravity, are discharged in one direction, while the air, purified by the action of water or other moistening agent from the foul gases or odors, is permitted to escape in a different direction.

I have contemplated a number of ways of carrying out my invention, and in the accompanying drawings have shown in one instance a suction-fan connected to a furnace-stack, and which fan being put in motion will take the smoke from the chimney and deliver it through a pipe into a centrifugal machine or separator, the inlet being, preferably, tangential, whereby the smoke is caused to assume a curved path in the chamber and the heavier particles are thrown out of the current and collected in a water-chamber at the bottom of the separator. The exhaust from the engine is preferably delivered into the passage from the furnace-stack to the separator, and a jet of water may be thrown also into this passage, and the current of smoke coming in contact therewith or with the spray thereof is moistened, whereby the heavier particles in the current are weighted. In another instance the water is sprayed by the action of a revolving brush. I have also shown how a number of furnaces may be cared for by a single separator and fan.

In the accompanying drawings, Figure 1 is an elevation of a furnace and fan-case with a driving-belt and pulley and showing a centrifugal separator connected with the fan by a pipe and having a receiving-tank below its discharge for the collected material and a valve-controlled pipe through which a moistening agent is delivered. Fig. 2 is a plan view. Fig. 3 is a transverse section through the separating-chamber. Fig. 4 is an elevation showing a different form of separating-chamber having a water-tank below its discharge. Fig. 5 is a transverse section, and Fig. 6 a longitudinal sectional view, of the separator shown in Fig. 4. Fig. 7 is a diagrammatic view showing my invention applied to the purification of the air from a number of sources in the same vicinity.

In the drawings, Fig. 1, A represents the furnace, and B the stack thereof.

C represents a suction-fan driven by any suitable power from the belt *c* and pulley D.

E is the casing of the separator, and F a pipe connected to the discharge-opening of the fan and which enters the casing of the separator tangentially.

G is a pipe, which delivers exhaust-steam into pipe F, and H a pipe through which water may be delivered. Pipe H terminates in a spiral coil $h$, perforated to break the water into spray, which action is augmented by the exhaust-steam, whereby the smoke is moistened and the heavier particles weighted, so as to render the separation easily accomplished. The smoke upon entering the separator through the tangential inlet has imparted to it thereby and by the curved walls of the chamber a spiral course, and the heavier particles are thrown to the walls of the casing, and, separating from the air-current, fall down by gravity and discharge through an opening at the lower end of the casing, preferably into a body of water in the tank I, while the air freed from the foreign particles escapes through the discharge-pipe J.

Figure 6:
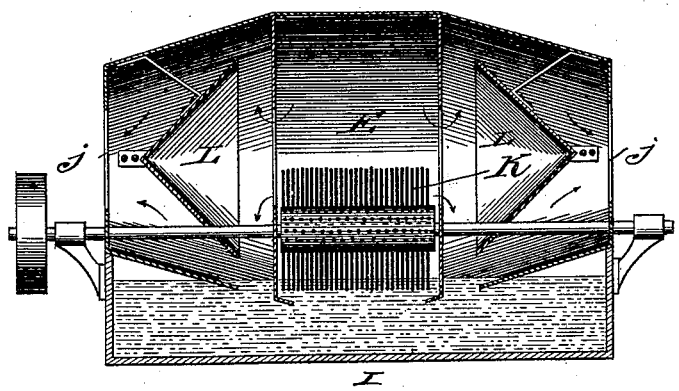

In the form of separator shown in Figs. 4, 5, and 6 the moistening of the air-current is effected by the action of the brush K, rotating in contact with the body of water and casting the water in spray upwardly into the air-current. In this instance the separator is placed in a horizontal position and the air is admitted on its side, escape-passages $j\ j$ for the purified air being provided at each of its ends. Deflectors L may be used to direct the air-currents toward the peripheral walls of the chamber.

In Fig. 7 I have shown the invention elaborated into a system for purifying the discharge from a number of chimneys in the same vicinity, B denoting the location of the various chimneys, and E a centrally-located separator, into which debouches a main conduit F, having the fan C, and connected by branches F' with the several chimneys. These conduits may be underground, and the system may be applied to a large factory or group of buildings having numerous furnaces, tanks, or other smoke or odor discharge flues or stacks.

While I have described the best forms of apparatus known to me for carrying out my method, it will be understood that the form of said apparatus may be changed and that either exhaust-steam or water may be used to deodorize the air-currents and moisten the smoke particles, which latter consist, mainly, of unconsumed fuel, cinders, and sparks in a more or less finely divided condition. These particles thus separated from the smoke and collected are valuable for many purposes—as, for example, ingredients for fire-proof paint. The sparks are of course extinguished in the operation, and danger of conflagration thus obviated.

In the action of the machine the injected water will pass down with the heavier particles and be collected, preferably, with them below the discharge-aperture in the bottom of the machine, and this water when drained off may be pumped back to the separator for use again.

The separation may be effected so completely and thoroughly in the manner above described that the current of air issuing from the top of the machine will not contain sufficient foreign particles to render it unfit to breathe or injurious to goods. The exhaust-fan may take the place of the usual furnace-stack, and therefore the application of this method to new plants need not involve as great expense as the present methods, wherein a tall stack must be built to secure a proper draft for the furnace.

While I prefer to use a fan to move the air-currents, my invention is not limited to a fan, as the blast may be induced in other ways—as, for example, by the injection of steam into the conduit, or in other ways.

I claim—

1. The method of purifying air from odorous gases and suspended impurities, which consists in moistening the air and delivering it under blast tangentially into a chamber having curved walls and separated outlets for the purified air and the separated particles, whereby is imparted to the air-current a whirling motion tending to separate the solid particles by the action of centrifugal force and gravity, substantially as described.

2. The method of purifying air from odorous gases and suspended impurities, which consists in delivering the air tangentially under pressure into a chamber having curved walls and separate outlets for the purified air and the separated particles, whereby is imparted to the air-current a whirling motion within the chamber tending to separate the solid particles by the action of centrifugal force and gravity and moistening the air-current within the chamber by a spray of water during the process of separation, substantially as described.

ALBERT RAYMOND.

Witnesses:
C. C. LINTHICUM,
OSWALD KÜTSCHE.